United States Patent [19]

Massey et al.

[11] 4,362,181
[45] Dec. 7, 1982

[54] PRESSURE RELIEF SYSTEM

[75] Inventors: Lester G. Massey, Chagrin Falls, Ohio; David A. George, Park Forest, Ill.; Robert I. Brabets, Lombard, Ill.; William A. Abel, Joliet, Ill.

[73] Assignee: CNG Research Company, Cleveland, Ohio

[21] Appl. No.: 129,655

[22] Filed: Mar. 12, 1980

Related U.S. Application Data

[63] Continuation of Ser. No. 935,992, Aug. 22, 1978, abandoned.

[51] Int. Cl.³ ............................................. F17C 13/12
[52] U.S. Cl. ............................... 137/68 R; 277/237 R
[58] Field of Search ................... 277/237 R; 137/68 R

[56] References Cited

U.S. PATENT DOCUMENTS

| | | | |
|---|---|---|---|
| 2,719,532 | 10/1955 | Grant | 137/68 R |
| 2,962,038 | 11/1960 | Bird | 137/68 R |
| 3,648,893 | 3/1972 | Whiting | 137/68 R |
| 3,966,226 | 6/1976 | Roth | 137/68 R |

*Primary Examiner*—Robert I. Smith
*Attorney, Agent, or Firm*—Allegretti, Newitt, Witcoff & McAndrews

[57] ABSTRACT

A pressure relief apparatus for a high pressure slurry processing system is disclosed. The apparatus includes a pressure container, an escape member in the container inlet and a flow restrictor in the container outlet.

4 Claims, 4 Drawing Figures

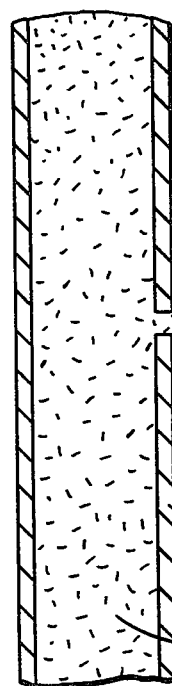
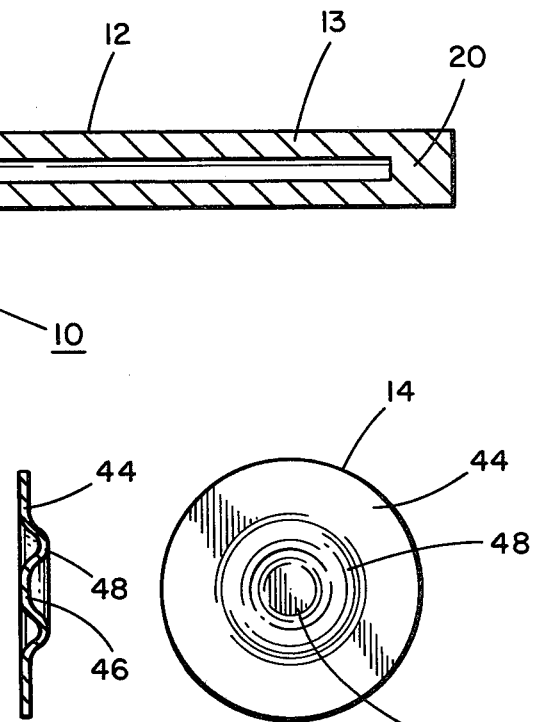
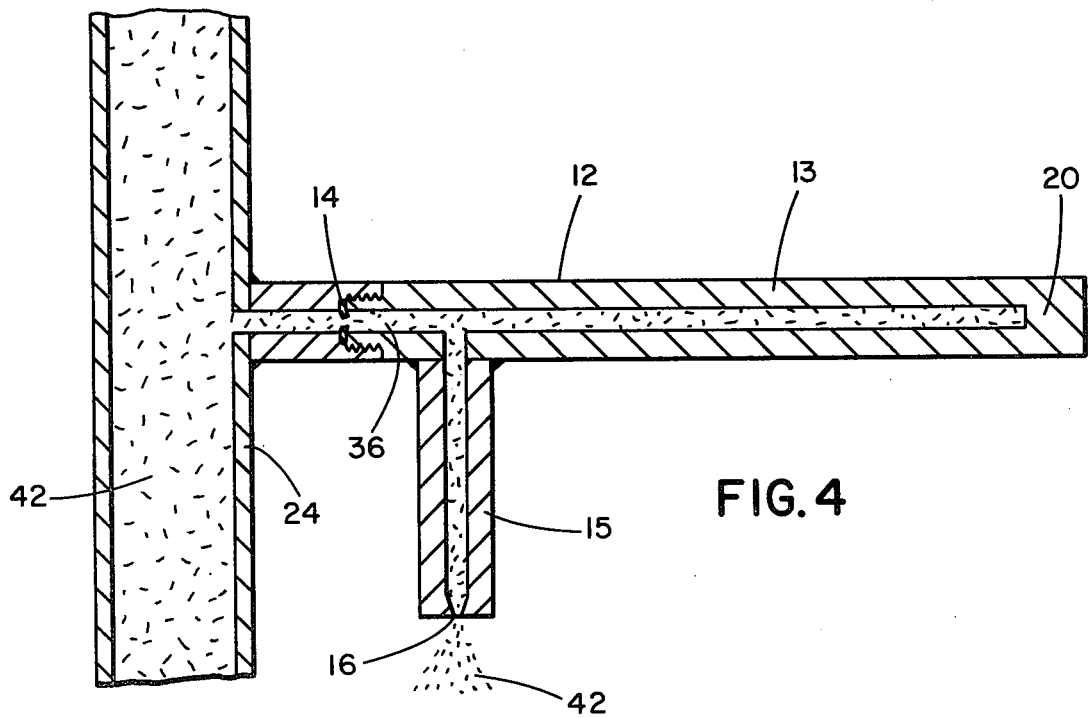
FIG. 1 FIG. 2 FIG. 3 FIG. 4

PRESSURE RELIEF SYSTEM

This is a continuation of application Ser. No. 935,992, filed Aug. 22, 1978, and now abandoned.

BACKGROUND OF THE INVENTION

The present invention relates to a pressure relief apparatus, and more particularly, to a pressure relief apparatus for a high pressure slurry processing system.

In the processing of coal slurries, it has been found desirable to elevate a superheated slurry of about 50% water and about 50% particulate coal solids to pressures of 10,000–15,000 pounds per square inch (psi) and higher. Because of the presence of the particulate coal solids in the system, certain components of the system tend to become clogged, reducing or blocking slurry flow. To prevent the substantial damage which would result from the explosion of an over-pressurized reaction vessel, a rupture disc of conventional construction has been tested in an orifice open to a conduit of the processing system. It has been found, however, that the abrupt, high magnitude pressure drop resulting from the rupture of a rupture disc causes slurry flow within the system to be reduced drastically. Consequently, the particulate coal solids agglomerate, or set into a solid mass, thereby obstructing the reaction vessel of the system and associated slurry conduits. When a constant pressure pump is being utilized with the slurry processing system, an additional consequence is that the pump accelerates rapidly toward self-destructive velocities. As a third consequence, the slurry experiences a 500°–700° F. thermal shock that is potentially damaging to the pump, O-rings and other temperature-sensitive system components. Finally, upon rupture, the fragments of the rupture disc are propelled at a bullet-like velocity from the orifice, creating a life- and equipment-endangering situation.

SUMMARY OF THE INVENTION

In a principal aspect, the present invention is a pressure relief apparatus comprising a pressure container, an escape member and a flow restrictor. The pressure container has an inlet and an outlet; the outlet is positioned out of the path which particles emitted from the escape member define during escape. The escape member, i.e. rupture disc, is secured within the inlet and the flow restrictor is secured within the outlet. The escape member seals the inlet when an external pressure not greater than a pre-selected pressure acts on the pressure member from external the container, and opens, i.e. ruptures to open the inlet when the external pressure exceeds the pre-selected pressure. The flow restrictor restricts flow through the outlet.

It is thus a principal object of the present invention to provide a pressure relief apparatus for utilization in a system for processing slurries having 50% and more particulate solids and pressures of 10–15,000 psi and higher.

Another object of the present invention is to provide a pressure relief apparatus which prevents the particulate solids from agglomerating upon depressurization of the processing system.

Another object of the present invention is to provide a pressure relief apparatus which allows for time to flush particulate solids from the processing system.

A further object of the present invention is to provide a pressure relief apparatus which maintains the pressure of the slurry within the system at a pressure above the critical pressure of water, over an extended period of time.

A still further object of the present invention is to provide a pressure relief apparatus which prevents thermal shock to the system due to the pressure drop caused by depressurization of the system.

A still further object of the present invention is to provide a pressure relief apparatus which, when in combination with a constant pressure pump, provides a controlled pressure against which the pump can operate without acceleration toward self-destructive velocities.

These and other objects and advantages of the present invention will be described in relation to the preferred embodiment of the present invention, the detailed description of which follows.

BRIEF DESCRIPTION OF THE DRAWING

The preferred embodiment of the present invention will be described in relation to the accompanying drawing, wherein:

FIG. 1 is a cross-sectional view of the pressure relief apparatus of the preferred embodiment;

FIG. 2 is a cross-sectional view of the rupture disc of the pressure relief apparatus of FIG. 1;

FIG. 3 is a side view of the rupture disc of FIG. 2; and

FIG. 4 is a view similar to FIG. 1, depicting the apparatus after rupture of the rupture disc.

DETAILED DECRIPTION OF THE PREFERRED EMBODIMENT

Referring to FIG. 1, the preferred embodiment of the present invention is a pressure relief apparatus shown and generally designated 10. The apparatus 10 includes a pressure container 12, an escape member such as rupture disc 14, and a flow restrictor such as an orifice 16.

As shown, the container 12 includes a first tubular portion 13 and an integrally formed or welded second tubular portion 14. The portion 13 has a closed end 20 and an opposed open end 22. The open end 22 is adapted to be secured to a conduit 24, which is a part of a coal slurry processing system. The system may include a slurry reaction vessel (not shown) and a pump or pumping system (not shown) such as a constant pressure pump.

The open end 22 is secured through the cooperation of male threads 26 formed on an outer surface of the end 22 and female threads 28 formed on an inner surface of a conduit tap 40, which is secured by welding or the like to the conduit 24. An inlet 36 is thus defined in the end 22, with which the interior of the conduit 24 communicates.

Secured within the inlet 36 between opposed faces on the conduit tap 40 and the end 22 is the rupture disc 14. As shown in FIG. 1, when intact, the rupture disc 14 blocks the inlet 36 and prevents slurry 42 that is within the conduit 24 from entering the container 12. When ruptured, however, as shown in FIG. 4, the rupture disc 14 substantially opens the inlet 36.

The rupture disc 14 remains intact as long as a pressure not greater than a pre-selected pressure acts thereon. In the apparatus 10, the rupture disc 14 thus seals or blocks the inlet 36 when a pressure not greater than a first pre-selected pressure acts on the rupture disc 14 from external the pressure vessel, i.e., from within the conduit 24, and ruptures to substantially open the inlet 36 when a pressure greater than the first preselected pressure is exceeded.

As shown in FIGS. 2 and 3, the rupture disc 14 is circular, having a planar, annular retaining section 44, a co-planar, circular central section 46 and an interposing, annular rupture section 48. The rupture section 48 is concave as seen in FIG. 3. Rupture of the rupture disc 14 occurs due to shear along the rupture section 48. The central section 46 thus separates from the retaining section 44, and fragments are propelled out of the inlet 36.

Referring again to FIG. 1, the tubular portion 13 is elongated and the tubular portion 15 is connected to the portion 13 adjacent the end 22. At the free end of the portion 15, the orifice 16 is defined. The orifice 16 is thus removed from the paths which fragments of the central portion 46 define during rupture. That is, upon rupture, a momentum is imparted to the fragments which propels them along the tubular portion 13. The length to diameter ratio of the tubular portion 13 is chosen so that the momentum carries the fragments past the orifice 16. As a result, the orifice 16 remains clear during and after rupture.

Any fluid which enters the portion 13 through the conduit 24 may thus exit the portion 15 through the orifice 16, at a rate reduced from the rate of entry, because of the small size of the orifice 16.

As most preferred, the apparatus 10 is utilized in combination with a slurry processing system in which the slurry 42 comprises 50% water and 50% particulate coal solids. The system includes a constant pressure pump that supplies a pressure above the critical pressure of water and most preferably, within the range of 10,000–15,000 psi. The slurry is pumped to a nozzle (not shown) of about 0.030 inch diameter, through which the slurry is expelled. It is the nozzle which may become clogged.

In such a system, the rupture disc 14 is designed to rupture at substantially 16,000 psi, to prevent substantial over-pressurization of the system. The orifice 16 has a diameter of about 0.040 inches, and the length-to-diameter ratio of the portion 13 is above 5, and most preferably about 20. When rupture occurs, the fragments of the disc 14 blown from the inlet 36 comes to rest in the closed end 20 of the container 12. The slurry 42 enters the container 12 and is then emitted to the atmosphere through the orifice 16, as shown in FIG. 4. Upon entry of the slurry into the container 12, there is a sudden drop in the pressure within the system to a second preselected pressure, most preferably about 5,000 psi. If the pump is not immediately stopped, the pump accelerates, through a range of safe velocities and against the resistance of the orifice 16, to return the system to substantially its original pressure. If the pump is stopped, the system pressure decreases linearly, with respect to time, to the critical pressure of water and thereafter decreases at a continuously decreasing rate.

From the foregoing, it should be apparent that the foregoing objects, as well as other objects and advantages, are satisfied by the present invention, and particularly by the preferred embodiment of the present invention. For example, the orifice 16 having been placed outside the path of the rupturing rupture disc 14, the safety of the apparatus 10 and the system is greatly increased. In other words, the risk of personal injury and equipment damage from rupture of the rupture disc 14 are eliminated.

It should thus be apparent that a novel and highly useful pressure relief system has been disclosed herein. Moreover, it should be apparent that changes and modifications could be made to the pressure relief system 10 of the preferred embodiment. For example, a larger opening could be located in the portion 15 in the place of the orifice 16, with threads traced therealong for receiving alternate flow restrictor members, having different sized orifices defined therein. The size of the orifice and thus the time for flushing could then be changed rapidly, to permit operation with slurries of different solid contents. The preferred embodiment is thus to be considered as illustrative and not restrictive, the scope of patent protection being measured by all equivalents within the scope of the appended claims.

What is claimed is:

1. In a system for processing a high solids content coal slurry at high temperature and pressures, said processing system comprising a reaction vessel and pumping system which safely withstand a first predetermined pressure level, the improvement of an emergency pressure relief system, comprising, in combination:

a pressure container having first and second elongated tubes, said first elongated tube having a passageway, an open end, and a closed end, the open end of said first elongated tube defining a solitary inlet from the reaction vessel into the pressure container, said second elongated tube having a passageway with exposed open ends and extending generally transversely from the first elongated tube, the first open end of the second elongated tube communicating with the passageway of the first elongated tube to define a solitary outlet from said first elongated tube, the second open end of the second elongated tube defining a solitary outlet from the pressure container;

means at the open end of said first elongated tube for connecting the pressure container to the reaction vessel;

means for sealing the solitary inlet to the pressure container, said means for sealing including means rupturable into fragments which are projected into the pressure container when the pressure in the reaction vessel is greater than the first predetermined pressure; and a flow restrictor in the second elongated tube at the second open end thereof for restricting flow through the outlet from said pressure container to a predetermined rate of flow;

the location of communication between the first open end of the second elongated tube and the passageway of the first elongated tube being adjacent the open end of the first elongated tube such that said location divides the passageway of the first elongated tube into a first passageway segment and a second passageway segment, said first passageway segment being between said sealing means and said solitary outlet from said first elongated tube, said second passageway segment being between said solitary outlet from said first elongated tube and said closed end of said first elongated tube, said second passageway segment defining fragment retention means which is removed from the solitary outlet of said first elongated tube for (1) capturing said fragments by providing that the momentum of rupture of the sealing means propels said fragments along the first elongated tube past the solitary outlet from the first elongated tube and into the fragment retention area, and (2) retaining the fragments there while slurry flows through the pressure container; and said pressure container, said sealing means and said flow restrictor defining controlled depressurization means for: (1) safely and suddenly decreasing the slurry pressure within the processing system below said first predetermined pressure (2) to a level above a second predetermined level for a predetermined interval of time that prevents thermal shock and agglomeration of the coal slurry in the processing system while (3) minimizing the likelihood that said emergency pressure relief may itself become obstructed and (4) maintaining the integrity of the reaction vessel and pumping system until said processing system can be cleared of coal slurry.

2. The improvement claimed in claim 1 wherein the flow restrictor defines an orifice at the second open end of the second tube.

3. The improvement claimed in claim 1 wherein the means in the first tube includes a passageway having a length-to-diameter ratio greater than five.

4. The improvement claimed in claim 3 wherein the length-to-diameter ratio of the passageway of the first elongated tube is greater than twenty.

* * * * *